United States Patent [19]
Greseth

[11] 3,921,464
[45] Nov. 25, 1975

[54] HANDLEBAR DRIVEN BICYCLE

[76] Inventor: Theodore S. Greseth, Rte. 2, Dawson, Minn. 56232

[22] Filed: Oct. 12, 1973

[21] Appl. No.: 405,862

[52] U.S. Cl. ............................... 74/37; 280/234
[51] Int. Cl. ........................................ F16h 19/05
[58] Field of Search .......... 105/88, 91; 74/523, 525, 74/37; 64/17 SP; 280/234, 233, 244, 245

[56] References Cited
UNITED STATES PATENTS

| | | | |
|---|---|---|---|
| 542,327 | 7/1895 | Brady | 105/91 |
| 553,083 | 1/1896 | Thompson | 105/91 |
| 598,026 | 1/1898 | Slippern | 280/234 |
| 1,018,264 | 2/1912 | Palmer | 105/88 |
| 2,510,013 | 5/1950 | Edgar | 280/234 |
| 3,636,909 | 1/1972 | Benson, Jr. | 64/17 SP |

FOREIGN PATENTS OR APPLICATIONS 102,560   11/1937   Australia ........................... 64/17 SP Primary Examiner—Wesley S. Ratliff, Jr.
Attorney, Agent, or Firm—Williamson, Bains & Moore

[57] ABSTRACT

A handlebar driven bicycle has a handlebar pivotally mounted to a steering post for upward and downward swinging movement about a generally horizontal axis. A follower arm is pivotally mounted to the bicycle frame adjacent the handlebar for swinging reciprocating movement about a horizontal axis, the follower arm being raised and lowered by a universal coupling extending between it and the handlebar. The follower arm is fixed to one end of a first crankshaft rotatably mounted on the frame, the remaining end of the shaft carrying a first bell crank which is pivotally mounted to an elongated driving arm which extends rearwardly along the frame for forward and rearward reciprocating movement in response to movement of the follower arm. A second crankshaft rotatably mounted to the frame carries a second bell crank fixed to one end of the second crankshaft and pivotally mounted to the rearward end of the driving arm, the remaining end of the second crankshaft having a sprocket, a chain meshingly engaging the sprocket to transmit rotation from the second crankshaft to the rear wheel thereby propelling the bicycle in response to upward and downward swinging movement of the handlebar.

5 Claims, 3 Drawing Figures

HANDLEBAR DRIVEN BICYCLE

BACKGROUND OF THE INVENTION

While many bicycles have been developed over the years, the commercially successful ones have had mechanical driving systems using only foot pedals, the rider's legs supplying all driving energy. Because the rider's legs tire after extensive pedaling, it would be desirable to propel the bicycle with arm movement or a combination of arm and leg movement, thereby providing a respite for the legs while the work is assumed in whole or part by the rider's arms. Such variation between leg and arm movement also provides more evenly distributed exercise for all parts of the rider's body.

While there have been efforts to develop bicycles utilizing the arms of the rider for propulsion, these efforts have been generally unsuccessful. For example, some early bicycles utilized swingable levers mounted to the frame near the handlebar, permitting the rider to steer with one hand and pump the lever with the remaining hand to propel the bicycle. Steering with one hand while propelling the bicycle with the remaining hand created balance and coordination problems for the rider which resulted in such bicycles never achieving great commercial success.

SUMMARY OF THE INVENTION

The invention relates to the field of bicycles and comprises a handlebar driven bicycle.

The handlebar driven bicycle has a bifurcated handlebar pivotally mounted to the steering post of the bicycle for upward and downward swinging movement about a generally horizontal axis. A first crankshaft is rotatably mounted to the frame below and adjacent the handlebar and carries a first bell crank fixed to one end and a follower arm fixed to the other, the follower arm being connected with the bifurcated handlebar through a universal coupling, causing the bell crank to undergo reciprocating movement in response to upward and downward swinging of the handlebar. A mechanical linkage interconnects the first bell crank with a second bell crank which is fixed to a second shaft rotatably mounted to the bicycle frame rearwardly of the first shaft. The second shaft carries a sprocket to which a chain drive is meshingly engaged, the chain drive extending to the rear wheel to turn the wheel in response to rotation of the second bell crank caused by upward and downward swinging of the handlebar.

The steering post to which the handlebar is pivotally mounted has a forwardly extending neck, positioning the pivotal mounting point of the handlebar further from the rider to permit the rider to obtain greater leverage on the handlebar while in a normal riding position.

Interconnecting means extend between follower arm and handlebar and include a rigid bar interconnecting the bifurcations of the handlebar and a universal coupling extending between the bar and the follower arm. The universal coupling makes it possible for the user to turn the handlebar to steer the vehicle while swinging the handlebar to propel the bicycle. A coil spring is positioned on the first crankshaft to urge the follower arm to a raised position, thereby urging the handlebar upwardly to provide a smooth driving action for the user.

The improved driving apparatus of the invention makes it possible for the rider to propel the bicycle using only his arms, only his legs, or combined action of arms and legs. Accordingly, when the legs of the rider become fatigued from extensive pedaling, the rider may utilize his arms to drive the bicycle while resting his legs. Alternatively, the arms and legs may be used in combination to drive the bicycle while reducing the stress on each.

The invention also permits the user to apply the standard foot brake of the bicycle by raising the handlebar. Pushing downwardly with the legs and feet on the rearward foot pedal to apply the foot brake in the conventional manner while simultaneously pulling upwardly on the handlebar with the hands and arms permits the user to apply brake force to the bicycle with both hands and feet while occupying a well braced position, thereby providing more firm and immediate stopping action than was possible with use of feet alone.

The improved driving apparatus is extremely durable, long lasting, reliable and easy to manufacture, while providing easier propulsion, less leg fatigue and greater riding enjoyment.

These and other objects of the present invention will become apparent from the following detailed description of the invention and from the appended drawing and claims.

DESCRIPTION OF THE PREFERRED EMBODIMENT

Figure 1:
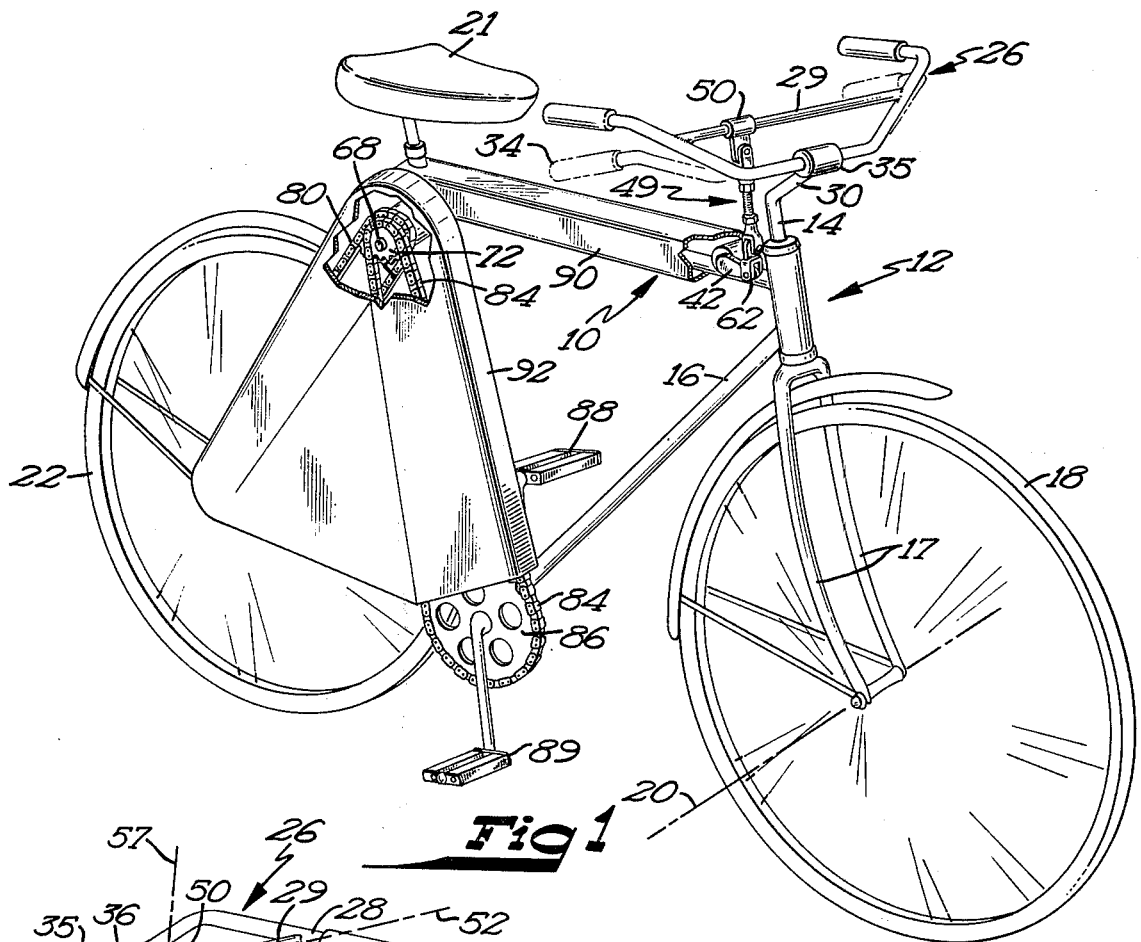
FIG. 1 is a perspective view of a bicycle embodying the invention.
Figure 2:
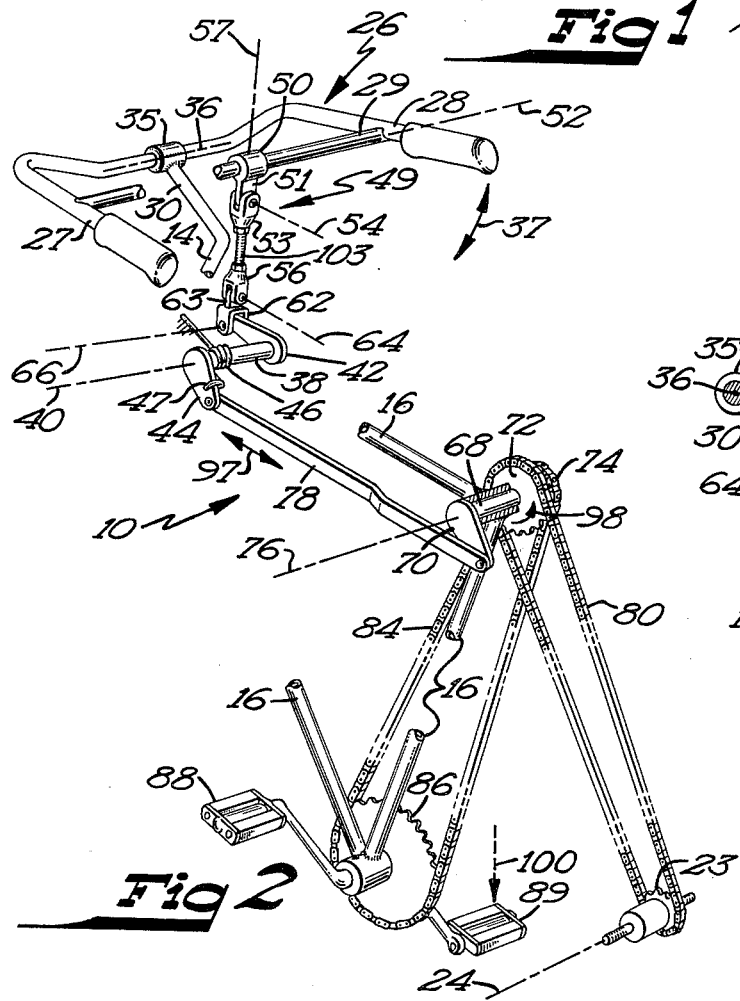
FIG. 2 is a perspective view of the driving apparatus used with the bicycle of FIG. 1.

Referring now to FIGS. 1 and 2, a handlebar driven bicycle 12 is provided with an improved driving apparatus 10. The bicycle 12 has a steering post 14 pivotally mounted to the rigid frame 16, the steering post 14 terminating at its lower end in a fork 17 in which the front wheel 18 is rotatably mounted for movement about a horizontal axis 20 as is well known to the art. Also mounted to the frame 16 is a standard seat 21. A rear wheel 22 is rotatably mounted to the frame 16 as is well known to the art and is provided with a standard bicycle sprocket 23, the rear wheel rotating about a generally horizontal axis 24.

Figure 3:
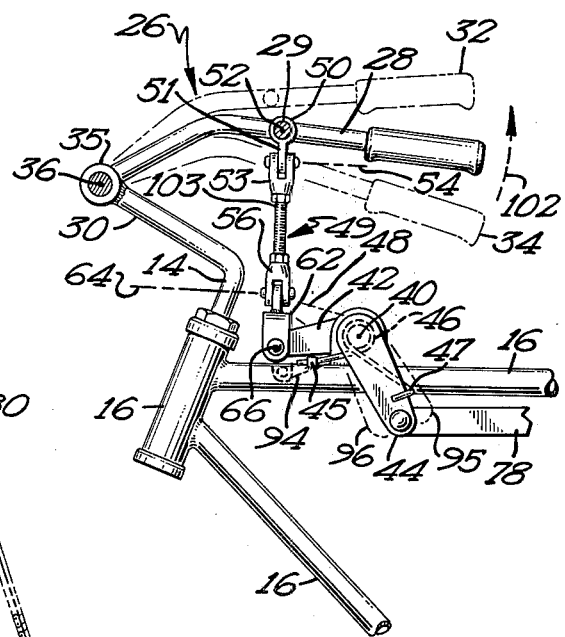
FIG. 3 is a side elevation view of the forward section of the apparatus of FIG. 2.

Referring now to FIGS. 2 and 3, the driving apparatus 10 has a bifurcated handlebar 26 with bifurcations 27 and 28 interconnected by a ridid bar 29, the bifurcations 27 and 28 defining left and right handgripping sections, respectively. The handlebar 26 is pivotally mounted in pivotal mounting 35 of forwardly extending section 30 of steering post 14, permitting the handlebar 26 to be swung in the directions of arrow 37 between upper position 32 and lower position 34, the handlebar 26 pivoting about a generally horizotal axis 36. It has been found helpful to have the section 30 extending forwardly from the steering post 14 to position the pivotal mounting 35 farther from the rider to permit the rider to exert greater upward and downward leverage on the handlebar for more efficient propulsion of the bicycle, as will be further described hereafter.

A first crankshaft 38 is rotatably mounted to the frame 16 of the bicycle in any known manner so as to permit the shaft to rotate about its longitudinal axis 40. One end of the shaft 38 is fixed to a follower arm 42 which extends radially outward from the shaft 38 and is rigidly fixed to the shaft 38 in any known manner such as key or splining. The remaining end of the shaft 38 has bell crank 44 fixed rigidly to the shaft 38 in any known manner and extending radially therefrom, a relatively rigid coil spring 46 being positioned about the shaft 38 with one end bearing against the frame 16 and retained thereto by clip 45 and the other end 47 looped about bell crank 44, the spring being tensioned to urge the bell crank to a forward position 96, biasing the follower arm 42 in a raised position 46 to assure smoother operation of the apparatus 10. While a particular spring 46 has been shown to bias the follower arm 42 in the raised position 46, it should be understood that other spring means may be substituted for the spring 38 and all such known alternatives are within the purview of the invention.

A universal coupling 49 interconnects the rigid bar 29 and follower arm 42. The upper end of the universal coupling has a sleeve 50 swingably encircling the bar 29 to permit relative rotational movement of sleeve 50 about axis 52 as the handlebar 26 moves between raised and lowered positions 32 and 34, respectively. The sleeve 50 has a web 51 extending downwardly therefrom, the web being pivotally mounted between the fork of link 53 for movement about an axis 54 which is generally parallel to the plane of the front wheel 18 of the bicycle. The web 51 and the fork of linkage 53 comprise a first pivotal mounting in the universal coupling 49 which permits the coupling 49 to move freely when the handlebar 26 is swung to left or right to steer the bicycle.

A second link 56 has its upper end pivotally mounted to the lower end of link 53 through shaft 103 for movement about a generally upright axis 57, aiding in permitting the handlebar to be rotated to the left or right to steer the bicycle. The lower end of link 53 and the upper end of link 56 and interconnecting shaft 103 form a second pivotal mounting permitting swinging movement about the generally upright axis 57.

A third link 62 is pivotally mounted to the follower arm 42 for movement about axis 66 and has an extending web 63 which is pivotally mounted to the lower forked end of second link 56. The fork of link 56 and the web 63 cooperate to define a third pivotal mounting permitting swinging movement about the axis 64 which is generally parallel to the plane of the rear wheel 22 to further aid in permitting the handlebar 26 to be swung toward left and right to permit steering of the bicycle. The third link 62 forms the lower end of the universal coupling 49 and is pivotally mounted to the follower arm 42 for swinging movement about a generally horizontal axis 66 to permit upward and downward swinging movement of the handlebar 26 during driving of the bicycle.

The rigid bar 29 and the universal coupling 49 collectively comprise a means interconnecting the follower arm 42 to the handlebar, serving the purpose of raising and lowering the follower arm in response to upward and downward swinging, respectively, of the handlebar, the means permitting the handlebar to swing the steering post 14 to steer the bicycle. While a particular geometric configuration has been shown for the rigid bar 29, other shapes and points of attachment on the handlebar could be substituted and all such modifications are within the purview of the invention.

A second crankshaft 68 is rotatably mounted to the frame 16 rearwardly of the first camshaft 38, and preferably being positioned below and generally adjacent the seat 21 of the bicycle. The shaft 68 may be rotatably mounted or journaled to the frame 16 in any known manner and carries a bell crank 70 fixed to one end of the shaft 68 in any known manner. The remaining end of the shaft 68 carries a first sprocket 72 and a second sprocket 74, the sprockets both being fixed to the shaft 68 in any known manner to rotate therewith about a generally horizontal axis 76 generally parallel to the axis 40.

An elongated driving member such as Johnson bar 78 has its ends pivotally mounted to bell crank 44 and 70 to rotate the shaft 68 in response to reciprocating movement of the shaft 46. Accordingly, as the shaft 38 swings through its arc to transmit movement to bell crank 44, the bar 78 moves forwardly and rearwardly to repeatedly rotate the bell crank 70 and attached shaft 68.

A standard bicycle chain 80 is meshingly engaged with sprocket 72 and extends about and meshingly engages the standard sprocket 82 used on the rear bicycle wheel 22.

The rotatable shaft 38, bell crank 44, elongated driving member 78, bell crank 70, rotatably mounted shaft 68, sprocket 72 and chain 80 collectively comprise a mechanical linkage drivingly connecting the follower arm 42 to the rear wheel 22 to rotatably drive the rear wheel in response to upward and downward reciprocating movement of the follower arm 42 generated by swinging movement of the handlebar 26 about the generally horizontal axis 36. While a particular mechanical linkage has been described to interconnect the follower arm and the rear wheel, it should be understood that various modifications and variations may be made in the linkage without departing from the spirit of the invention and are within the purview of the invention.

A second chain 84 meshingly engages the second sprocket 74 and extends about the pedal sprocket 86 permitting the chain drive 84 to be operated by the feet and legs of the rider by moving the pedals 88 and 89 to rotate sprocket 86, thereby transmitting rotational movement to the sprocket 72. The sprocket 72, chain 84, sprocket 86 rotatably mounted to the frame 16 along with the pedals 88 and 89, collectively comprise a foot pedal actuated propulsion system mechanically coupled to the camshaft 68 to rotate the camshaft 68 in response to pedaling.

Accordingly, the rear wheel 22 may be driven by means of pedaling the bicycle in the conventional manner or alternatively may be driven by swinging the handlebar 26 upwardly and downwardly about the generally horizontal axis 36 or by a combination of both. With the shown apparatus 10, when the handlebar 26 is moved upwardly and downwardly, the pedals 88 and 89 rotate with the sprocket 86, or alternatively the handlebar 26 moves upwardly and downwardly in response to pedaling. While this combination offers advantages, if desired a ratchet system may be installed on the axle 68 to permit driving movement to be transmitted to the sprocket 72 from the handlebar 26, but to block movement being transmitted from the rotation of sprocket 72 toward the handlebar. Such an arrangement would make it possible to propel the bicycle by pedaling or by use of the handlebar without the handlebar moving in response to pedaling.

Referring now to FIG. 1, a generally horizontal guard 90 is positioned about the Johnson bar 78 and the rear crankshaft 68 to protect an operator from becoming entangled in the mechanical system. A second guard 92 of generally triangular appearance is mounted to the frame and covers the chains 80 and 84 and the sprocket 72 and 74 associated therewith, thereby protecting the legs of the user from becoming entangled in the chain drive and providing greater safety for the operator.

In operation, the rider of the bicycle 12 grasps the bifurcations 27 and 28 of the handlebar 26 and when handlebar 26 is in a raised position 32 pushes them downwardly to a lowered position 34, the handlebar 26 pivots smoothly about the axis 36 which is placed well forwardly of the upright section of the steering post 14 to provide excellent leverage for the rider. As the handlebar 26 moved downwardly from the raised position 32, it exerts a downwardly directed force on the follower arm 42 by means of the universal coupling 49. In moving downwardly, the sleeve 50 pivots relative to bar 29 and third link 62 pivots about axis 66 where it joins the follower arm 42. As the universal coupling 49 moves downwardly, it swings follower arm 42 from raised position 48 downwardly to lowered position 94, the follower arm 42 pivoting about axis 40 of crankshaft 38. As the handlebar is returned to the raised position 32 as will be described hereafter, the follower arm 42 moves upwardly to the raised position 48, and reciprocates between the positions 46 and 94 as the handlebar is operated.

Swinging of the follower arm 42 results in reciprocating partial rotation of shaft 38 to which the arm 42 is rigidly fixed. As the shaft 38 rotates within the arc defined by the positions 94 and 48 of the follower arm 42, the motion is transmitted to the bell crank 44 which is fixed to the remaining end of shaft 38. Accordingly, as the follower arm 42 moves from position 48 to position 94, the bell crank 44 moves from forward position 96 to rearward position 95, respectively. As the bell crank 44 moves from forward to rearward position, the coil spring 46 positioned about shaft 38 and fixed at one end to the frame 16 and the other end 47 to crank 44 becomes increasingly tensioned, causing an increasing restoring force to be applied to the bell crank 44, resulting in the bell crank being urged toward position 96 and follower arm 42 being urged toward raised position 48.

As the bell crank 44 reciprocates between forward and rearward positions 96 and 95, respectively, the member 78 moves with it in forward and rearward directions 97. As the bell crank 44 reciprocates between its shown positions 96 and 95, the member 78 causes second bell crank 70 to rotate through 360° in the direction of arrow 98, thereby rotating the sprockets 72 and 74. As the sprocket 72 rotates, its motion is transmitted to the engaged bicycle chain 80, thereby turning the sprocket 23 on the rear wheel 22 of the bicycle and propelling it forwardly.

The sprocket 74 rotates with sprocket 72 in response to rotation of shaft 68 and the bicycle chain 84 transmits such movement to the sprocket 86 associated with the bicycle pedals. Accordingly, movement of shaft 68 produces corresponding movement of the sprocket 86 and the pedals 88 and 89.

If desired, the rider or operator may cease operating the handlebar for propulsion and instead drive the bicycle by pedaling of pedals 88 and 89 to provide propulsion energy. When the pedals are used, the rotation of sprocket 86 is transmitted to the sprocket 74 on shaft 68 by means of the chain 84, and movement of shaft 68 is transmitted to the sprocket 23 of rear wheel 22 of the bicycle by means of the chain 80 as has already been described.

When it is necessary for the rider to turn the handlebar in order to steer the bicycle or to balance the bicycle, the universal mounting 49 permits such movement without adverse impact on the driving apparatus 10. As the handlebar 26 is rotated about the steering post 14, the second pivotal mounting pivots about the axis 57, and simultaneously the first and second pivotal mountings pivot about axes 54 and 64, respectively, as the handlebar moves toward left or right.

When the operator desires to stop the bicycle, he may apply downward foot pressure in the direction of arrow 100 to the rearmost pedal 89 as is well known to those skilled in the art, or alternatively the operator may pull the handlebar 26 upwardly in the direction of arrow 102 (FIG. 3). When the handlebar is pulled upward the movement is transferred through the universal coupling 49 and follower arm 42 to shaft 38, resulting in the bell crank 44 being swung forwardly toward position 96 thereby pulling the bar 78 forwardly. Abrupt forward movement of bar 78 swings bell crank 70 in a clockwise direction as viewed in FIG. 2, causing the sprockets 72 and 74 to rotate in a direction opposite to the arrow 98. Such movement of sprockets 72 and 74 applies braking force to the rear wheel 22 in the same manner as downward pressure on the brake pedal 89, thereby producing a braking. Improved braking results can be obtained by the simultaneous application of force to the pedals and to the handlebar, the operator being in a position on the bicycle where downward force is easily applied to pedal 89 while simultaneously applying upward force to the handlebar by simply stretching the body and using the pedal 89 as a brace by which additional force may be applied upwardly against the handlebar. The simultaneous application of forces to handlebar and pedal 89 produces improved braking results.

Accordingly, the present invention provides an improved driving apparatus for a bicycle, permitting the operator to propel the bicycle by foot and leg movement, hand and arm movement, or a combination of the two, thereby reducing the fatigue to feet and legs alone or to hands and arms alone and providing more balanced exercise to the operator.

While a particular form or embodiment of the invention has been shown and described herein for illustrative purposes and the construction and arrangement of the components thereof have been disclosed and discussed in detail, it is to be understood that the invention is limited neither to the mere details or relative arrangement of parts, nor to its specific embodiment shown herein, but that extensive deviations from the illustrated forms or embodiments of the invention may be made without departing from the spirit of the invention.

What is claimed is:

1. In combination with a bicycle having a frame, a steering post pivotally mounted to said frame for steering movement about a generally upright axis, a front wheel rotatably mounted to said steering post, and a rear wheel rotatably mounted to said frame, and improved driving apparatus comprising:

an integral handlebar pivotally mounted to said steering post for upward and downward swinging movement about a generally horizontal axis, said integral handlebar including left and right handgripping sections extending outwardly from said steering post and stationary relative to one another so that an operator may apply his full weight to said left and right sections of said handlbar in urging them downwardly;

a follower arm pivotally mounted relative to said frame adjacent said handlebar for swinging reciprocating movement between raised and lowered positions about a generally horizontal axis;

means interconnecting said follower arm to said handlebar, raising and lowering said follower arm in response to upward and downward swinging, respectively, of said integral handlebar while permitting said handlebar to move with said steering post as said steering post pivots about said generally upright axis;

mechanical linkage drivingly connecting said follower arm to said rear wheel and rotatably driving said rear wheel in response to upward and downward reciprocating movement of said follower arm generated by swinging movement of said integral handlebar about said generally horizontal axis by an operator to propel the bicycle; and a spring biasing said follower arm toward raised position.

2. The improved driving apparatus of claim 1 wherein said interconnecting means includes a universal coupling and a rigid bar having its ends rigidly connected between said left handgripping section and said right handgripping section, said bar being connected to an end of said universal coupling.

3. The improved driving apparatus of claim 2 wherein said end of said universal coupling connected to said rigid bar is mounted to said bar for pivotal movement about an axis parallel to the axis of said front wheel.

4. The improved driving apparatus of claim 1 wherein said interconnecting means includes a universal coupling with first, second and third pivotal mountings, said first pivotal mounting permitting swinging movement about an axis parallel to the plane of said front wheel, said second pivotal mounting permitting swinging movement about a generally upright axis and said third pivotal mounting permitting swinging movement about an axis parallel to the plane of said rear wheel.

5. In combination with a bicycle having a frame, a steering post pivotally mounted to said frame for steering movement about a generally upright axis, a front wheel rotatably mounted to said steering post, and a rear wheel rotatably mounted to said frame, an improved driving apparatus comprising:

an integral handlebar pivotally mounted to said steering post for upward and downward swinging movement about a generally horizontal axis, said integral handlebar including left and right handgripping sections extending outwardly from said steering post and stationary relative to one another so that an operator may apply his full weight to said left and right sections of said handlebar in urging them downwardly;

a follower arm pivotally mounted relative to said frame adjacent said handlebar for swinging reciprocating movement between raised and lowered positions about a generally horizontal axis;

means interconnecting said follower arm to said handlebar, raising and lowering said follower arm in response to upward and downward swinging, respectively, of said integral handlebar while permitting said handlebar to move with said steering post as said steering post pivots about said generally upright axis;

mechanical linkage drivingly connecting said follower arm to said rear wheel and rotatably driving said rear wheel in response to upward and downward reciprocating movement of said follower arm generated by swinging movement of said integral handlebar about said generally horizontal axis by an operator to propel the bicycle;

a first crankshaft rotatably mounted to said frame;

a pivotally mounted follower arm being fixed to said crankshaft;

said mechanical linkage including a first bell crank fixed to and extending radially from said first crankshaft; and said mechanical linkage further including an elongated driving member pivotally mounted to said first bell crank and extending rearwardly for forward and rearward movement along said frame in response to movement of said follower arm between raised and lowered positions.

* * * * *